(12) United States Patent
Leeman-Munk et al.

(10) Patent No.: US 11,074,412 B1
(45) Date of Patent: Jul. 27, 2021

(54) MACHINE LEARNING CLASSIFICATION SYSTEM

(71) Applicant: SAS Institute Inc., Cary, NC (US)

(72) Inventors: Samuel Paul Leeman-Munk, Durham, NC (US); James Allen Cox, Cary, NC (US); David Blake Styles, Raleigh, NC (US); Richard Welland Crowell, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 17/202,413

(22) Filed: Mar. 16, 2021

Related U.S. Application Data

(60) Provisional application No. 63/083,307, filed on Sep. 25, 2020, provisional application No. 63/062,219, filed on Aug. 6, 2020, provisional application No. 63/056,593, filed on Jul. 25, 2020.

(51) Int. Cl.
| | |
|---|---|
| *G06F 40/30* | (2020.01) |
| *G06N 20/00* | (2019.01) |
| *G06F 40/284* | (2020.01) |
| *G06N 3/04* | (2006.01) |
| *G06N 3/08* | (2006.01) |

(52) U.S. Cl.
CPC ......... *G06F 40/284* (2020.01); *G06N 3/0445* (2013.01); *G06N 3/08* (2013.01)

(58) Field of Classification Search
CPC .... G06F 40/211; G06F 40/253; G06F 40/268; G06F 40/284; G06F 40/30; G06N 20/00; G06N 20/10
See application file for complete search history.

(56) References Cited

U.S. PATENT DOCUMENTS

| | | | |
|---|---|---|---|
| 10,360,507 B2 * | 7/2019 | Aravamudan | G16B 50/00 |
| 10,372,815 B2 * | 8/2019 | Simard | G06N 20/00 |
| 10,565,493 B2 * | 2/2020 | Merity | G06N 3/0472 |
| 10,997,405 B1 * | 5/2021 | Lam | G06K 9/00469 |

(Continued)

OTHER PUBLICATIONS

Delvin et al., "BERT: Pre-Training of Deep Bidirectional Transformers for Language Understanding," arXiv:1810.04805v2 [cs.CL] May 24, 2019, 16 pages.

(Continued)

*Primary Examiner* — Lamont M Spooner
(74) *Attorney, Agent, or Firm* — Bell & Manning, LLC

(57) ABSTRACT

A system trains a classification model. Text windows are defined from tokens based on a window size. A network model including a transformer network is trained with the text windows to define classification information. A first accuracy value is computed. (A) The window size is reduced using a predefined reduction factor value. (B) Second text windows are defined based on the reduced window size. (C) Retrain the network model with the second text windows to define classification information. (D) A second accuracy value is computed. (E) An accuracy reduction value is computed from the second accuracy value relative to the first accuracy value. When the computed accuracy reduction value is ≥an accuracy reduction tolerance value, repeat (A)-(E) until the accuracy reduction value is <the accuracy reduction tolerance value. Otherwise, increase the window size, define final text windows based on the increased window size, and retrain the network model.

30 Claims, 9 Drawing Sheets

(56) References Cited

U.S. PATENT DOCUMENTS

| | | | | |
|---|---|---|---|---|
| 11,010,564 | B2* | 5/2021 | Liu | G06N 3/04 |
| 11,023,677 | B2* | 6/2021 | Simard | G06F 3/0482 |
| 2011/0119050 | A1* | 5/2011 | Deschacht | G06F 40/216 |
| | | | | 704/9 |
| 2012/0209853 | A1* | 8/2012 | Desai | G06F 16/93 |
| | | | | 707/741 |
| 2015/0019204 | A1* | 1/2015 | Simard | H04L 1/0079 |
| | | | | 704/9 |
| 2015/0019211 | A1* | 1/2015 | Simard | G06F 40/30 |
| | | | | 704/10 |
| 2015/0019460 | A1* | 1/2015 | Simard | G06F 40/242 |
| | | | | 706/11 |
| 2015/0019461 | A1* | 1/2015 | Simard | G06F 40/30 |
| | | | | 706/11 |
| 2015/0019463 | A1* | 1/2015 | Simard | G06F 40/30 |
| | | | | 706/12 |
| 2015/0363688 | A1* | 12/2015 | Gao | G06F 16/9032 |
| | | | | 706/27 |
| 2018/0082171 | A1* | 3/2018 | Merity | G06F 40/284 |
| 2018/0082197 | A1* | 3/2018 | Aravamudan | G06N 5/04 |
| 2018/0174575 | A1* | 6/2018 | Bengio | G10L 15/02 |
| 2019/0114391 | A1* | 4/2019 | Jaganathan | G06K 9/6267 |
| 2019/0114511 | A1* | 4/2019 | Gao | G06K 9/6257 |
| 2019/0266493 | A1* | 8/2019 | Gao | G06N 3/08 |
| 2020/0050638 | A1* | 2/2020 | Hancock | G06F 16/90332 |
| 2020/0065677 | A1* | 2/2020 | Iriarte Lopez | G06N 3/084 |
| 2020/0065968 | A1* | 2/2020 | Sargent | G06T 7/10 |
| 2020/0073996 | A1* | 3/2020 | Wright | G06F 16/3347 |
| 2020/0175390 | A1* | 6/2020 | Conti | G06F 40/237 |
| 2020/0387797 | A1* | 12/2020 | Ryan | G06F 11/3058 |
| 2021/0124800 | A1* | 4/2021 | Williams | G06F 21/6245 |

OTHER PUBLICATIONS

Adhikari et al., "DocBERT: BERT for Document Classification," arXiv:1904.08398v2[cs.CL] Aug. 22, 2019, 7 pages.

Sun et al., How to Fine-Tune BERT for Text Classification? arXiv:1905.05583v3 [cs.CL], Feb. 5, 2020, 10 pages.

Liu et al., "RoBERTa: A Robustly Optimized BERT Pretraining Approach," arXiv:1907.11692v1 [cs.CL] Jul. 26, 2019, 13 pages.

Sanh et al., "DistilBERT, a distilled version of BERT: smaller, faster, cheaper and lighter," arXiv:1910.01108v4 [cs.CL] Mar. 1, 2020, 5 pages.

Mulyar et al., "Phenotyping of Clinical Notes with Improved Document Classification Models Using Contextualized Neural Language Models," arXiv:1910.13664v1 [cs.CL] Oct. 30, 2019, 5 pages.

Cairns et al., "NLP with BERT: Sentiment Analysis Using SAS Deep Learning and DLPy," Paper SAS 4429-2020, SAS Global Forum 2020, 11 pages.

Li et al., "A Fully Trainable Network with RNN-based Pooling," Neurocomputing, Jun. 2017, 17 pages.

BERT Long Document Classification, Multi-label Document Classification with BERT, blog published Sep. 14, 2019.

Kudo et al., "SentencePiece: A simple and language independent subword tokenizer and detokenizer for Neural Text Processing," *Proceedings of the 2018 Conference on Empirical Methods in Natural Language Processing (System Demonstrations)*, pp. 66-71, 2018.

Analyze Sentiment in Text with Amazon Comprehend tutorial, https://aws.amazon.com/getting-started/hands-on/analyze-sentiment-comprehend/, Amazon Web Services, Inc. 2020, 12 pages.

Mudhushree Basavarajaiah, Medium, "Maxpooling vs. minpooling vs average pooling," Feb. 8, 2019.

Python-dlpy/bert_model.py at master sassoftware/python-dlpy GitHub, 25 pages, printed Jan. 22, 2021.

Sentiment Analysis Action Set: Syntax, SAS Help Center: applySent Action, https://go.documentatin.sas.com/?docsetId=casanpg&docsetTarget=cas-sentimentanalysis-applysent.htm&docsetVersion=8.1&locale=en. SAS Insitutue Inc., print Jun 25, 2020.

Jay Alammar, The Illustrated BERT, ELMo, and co. (How NLP Cracked Transfer Learning), Blog, jalammar.github.io/illustrated=bert/, 20 pages, printed Jan. 19, 2021.

Jay Alammar, "The Illustrated Transformer—Visualizing machine learning one concept at a time," Blog, https://jalammar.github.io/illustrated -transformer/, 23 pages, updated 2020, printe3d Jan. 19, 2021.

Floydhub Blog, "How to code the Transformer in PyTorch," Oct. 9, 2018/Community, 29 pages.

KDnuggets Blog, "Understanding Convolutinoal Neural Networks for NLP," 2015, 5 pshrd, https://www.kdnuggets.com/2015/11/understanding-convolutinal-neural-networks-nip.htm/3.

McGoldrick et al., Understanding XLNet, Borealis Al, Jul. 10, 2019, 13 pages.

Watson Tone Analyzer—Overview IBM, IBM Cloud, printed Jul. 25, 2020 from https://www.ibm.com/cloud/watson-tone-analyzer, 6 pages.

\* cited by examiner

MACHINE LEARNING CLASSIFICATION SYSTEM

CROSS-REFERENCE TO RELATED APPLICATIONS

The present application claims the benefit of and priority under 35 U.S.C. § 119(e) to U.S. Provisional Patent Application No. 63/083,307 filed on Sep. 25, 2020, to U.S. Provisional Patent Application No. 63/062,219 filed on Aug. 6, 2020, and to U.S. Provisional Patent Application No. 63/056,593 filed on Jul. 25, 2020, the entire contents of which are hereby incorporated by reference.

SUMMARY

In an example embodiment, a non-transitory computer-readable medium is provided having stored thereon computer-readable instructions that, when executed by a computing device, cause the computing device to train a classification model. Tokens are defined for each document of a plurality of documents using a tokenizer. (A) Text windows are defined from the defined tokens based on a window size, where the window size indicates a number of tokens to include in each text window of the text windows, wherein the text windows are defined in a textual order from each document. (B) A network model is trained with the defined text windows to define first classification information. The network model includes a transformer network, a pooling network, and a classifier network. The defined text windows are input to the transformer network. A transformer output of the transformer network is input to the pooling network. A pooled output of the pooling network is input to the classifier network. The first classification information is an output of the classifier network. (C) Each document of the plurality of documents is classified using the first classification information to define a predicted class for each document. (D) A first accuracy value is computed by comparing the predicted class defined for each document to a predefined class defined for each document. (E) The window size is reduced using a predefined reduction factor value. (F) Second text windows are defined from the defined tokens based on the reduced window size. (G) The network model is trained with the defined second text windows to define second classification information. (H) Each document of the plurality of documents is classified using the second classification information to define a second predicted class for each document. (I) A second accuracy value is computed by comparing the second predicted class defined for each document to the predefined class defined for each document. (J) An accuracy reduction value is computed from the computed second accuracy value relative to the first accuracy value. (K) When the computed accuracy reduction value is greater than or equal to a predefined accuracy reduction tolerance value, (E) through (K) are repeated until the computed accuracy reduction value is less than the predefined accuracy reduction tolerance value. (L) When the computed accuracy reduction value is less than the predefined accuracy reduction tolerance value, the window size is increased using the predefined reduction factor value, final text windows are defined from the defined tokens based on the increased window size, the network model is trained with the defined final text windows, and the increased window size and the network model trained with the defined final text windows are output.

In another example embodiment, a computing device is provided. The computing device includes, but is not limited to, a processor and a non-transitory computer-readable medium operably coupled to the processor. The non-transitory computer-readable medium has instructions stored thereon that, when executed by the computing device, cause the computing device to train a classification model.

In yet another example embodiment, a method of training a classification model is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Natural language processing (NLP) is concerned with interactions between computers and human language, in particular how to train computers to process and analyze large amounts of natural language data so that the computer can understand the content of documents, including the contextual nuances of the language within them. Once trained the computer can accurately extract information and insights contained in the documents as well as categorize and organize the documents themselves. For example, if documents 124 include a set of news articles, labels can be assigned to each document to indicate categories of news such as sports, politics and world. A document can be given multiple labels.

BERT (Bidirectional Encoder Representations from Transformers) is a textual language model that allows the embedding of a fixed context window of text into a Euclidean space while preserving properties of the text (syntactic, contextual, etc.). BERT is trained over a large, unsupervised corpus in an encoder-decoder fashion with the final encoder parameters utilized to generate representations of new text. BERT accepts as input a sequence of tokens and outputs a vector that represents a condensed form of the token sequence. BERT may further produce per-token embeddings.

The BERT encoder accepts a fixed context window meaning that the model can only encode and generate contextualized representations for a fixed, finite sequence of tokens. Each document of the documents 124 is input as a finite sequence of tokens that may or may not fit into the fixed size context window. For example, a well-known implementation of BERT limits the context window size to 512 tokens where two of the tokens are special padding tokens ([CLS] and [SEP]) involved in the model pre-training objective that are included during encoding. The context window size restriction is imposed for tractability—speeding up pre-training and reducing memory requirements during utilization. The context window size affects both the accuracy and the speed of the training.

Figure 1:
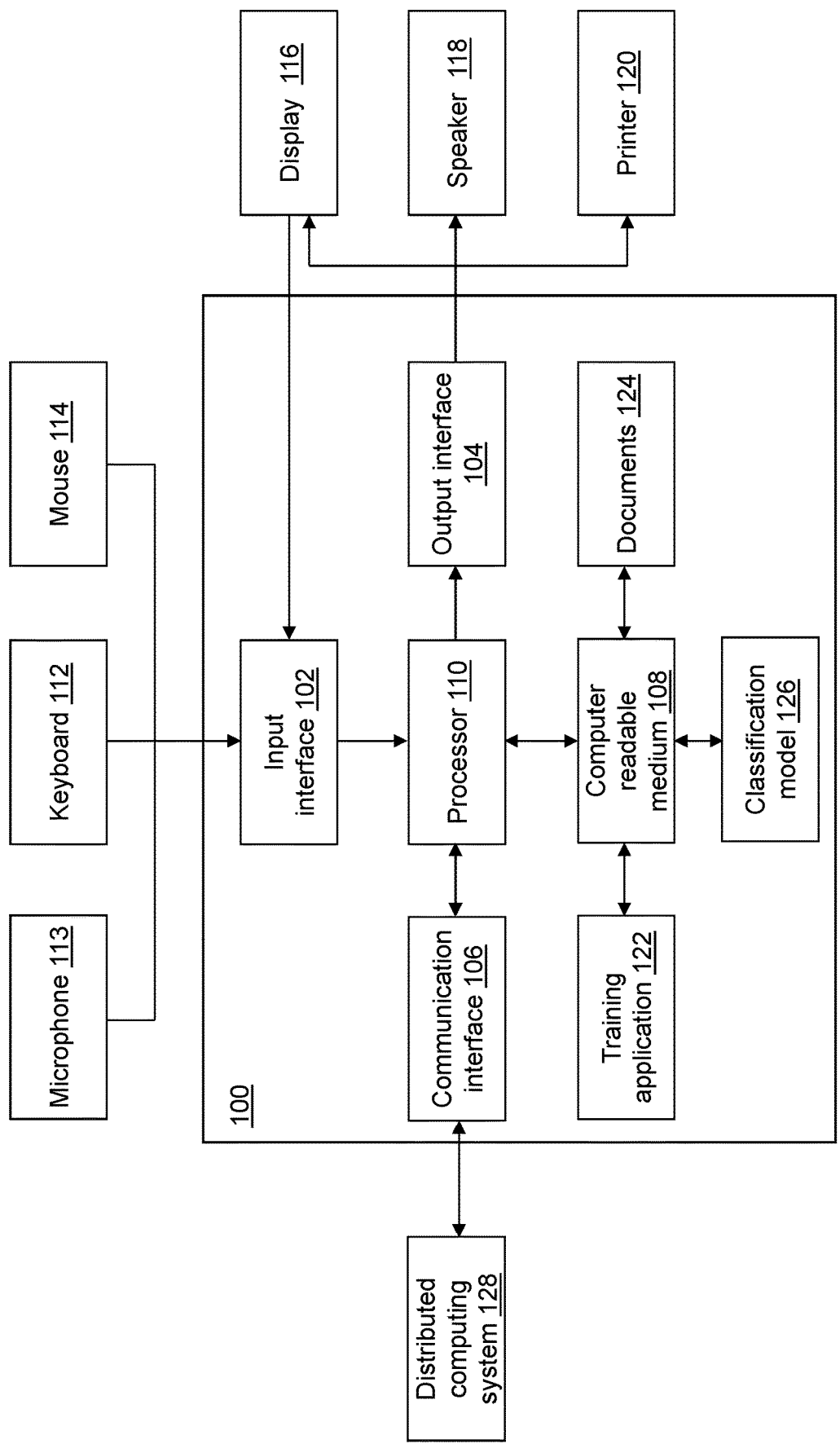
FIG. 1 depicts a block diagram of a classification training device in accordance with an illustrative embodiment.

Referring to FIG. 1, a block diagram of a classification training device 100 is shown in accordance with an illustrative embodiment. Classification training device 100 may include an input interface 102, an output interface 104, a communication interface 106, a non-transitory computer-readable medium 108, a processor 110, a training application 122, documents 124, and a classification model 126. Fewer, different, and/or additional components may be incorporated into classification training device 100. A document of documents 124 is any collection of text in a human language.

Training application 122 trains a network model to classify documents 124 that have been classified previously. Training application 122 also automatically selects an optimal window size considering both accuracy and speed. The trained network model may be stored in classification model 126 that is used by a classification application 322 (shown referring to FIG. 3) to classify second documents 324 (shown referring to FIG. 3) that have not been classified previously. For example, classification application 322 may be used to categorize each document to determine a sentiment such as positive, negative, neutral or mixed, to determine whether a document is spam or not spam, to determine a newspaper article section for a document, etc. Classification application 322 may process batches measured in terms of fixed-size windows of text contained rather than number of documents contained. As a result, classification application 322 provides a more consistent runtime and memory usage when document length varies and guarantees a maximum memory usage, enabling more aggressive batch size specifications and more efficient processor use.

Input interface 102 provides an interface for receiving information from the user or another device for entry into classification training device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into classification training device 100 or to make selections presented in a user interface displayed on display 116.

Output interface 104 provides an interface for outputting information for review by a user of classification training device 100 and/or for use by another application or device. For example, output interface 104 may interface with various output technologies including, but not limited to, display 116, a speaker 118, a printer 120, etc. Classification training device 100 may have one or more output interfaces that use the same or a different output interface technology. The output interface technology further may be accessible by classification training device 100 through communication interface 106.

The same interface may support both input interface 102 and output interface 104. For example, display 116 comprising a touch screen provides a mechanism for user input and for presentation of output to the user. Classification training device 100 may have one or more input interfaces that use the same or a different input interface technology. The input interface technology further may be accessible by classification training device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Classification training device 100 may have one or more communication interfaces that use the same or a different communication interface technology. For example, classification training device 100 may support communication using an Ethernet port, a Bluetooth antenna, a telephone jack, a USB port, etc. Data and messages may be transferred between classification training device 100 and a distributed computing system 128 using communication interface 106.

Non-transitory computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. classification training device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Classification training device 100 also may have one or more drives that support the loading of a memory media such as a CD, DVD, an external hard drive, etc. One or more external hard drives further may be connected to classification training device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Classification training device 100 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphics processing unit (GPU), an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Training application 122 performs operations associated with training the network model and selecting a window size that reduces a runtime of classification application 322 while maintaining an accuracy within a predefined reduction factor value of a maximum accuracy achieved by the trained network model. The operations may be implemented using hardware, firmware, software, or any combination of these methods. Referring to the example embodiment of FIG. 1, training application 122 is implemented in software (comprised of computer-readable and/or computer-executable instructions) stored in computer-readable medium 108 and accessible by processor 110 for execution of the instructions that embody the operations of training application 122. Training application 122 may be written using one or more programming languages, assembly languages, scripting languages, etc. Training application 122 may be integrated with other analytic tools such as classification application 322. As an example, training application 122 may be part of an integrated data analytics software application and/or software architecture such as that offered by SAS Institute Inc. of Cary, N.C., USA. For example, training application 122 may be integrated with one or more SAS software tools such as SAS® Enterprise Miner™, SAS® Visual Text Analytics, SAS® Visual Analytics, SAS® Contextual Analysis, Base SAS, SAS/STAT®, SAS® High Performance Analytics Server, SAS® LASR™, SAS® In-Database Products, SAS® Viya™, SAS In-Memory Statistics for Hadoop®, SAS® Event Stream processing (ESP), SAS® Mobile BI, SAS Conversation Designer, all of which are developed and provided by SAS Institute Inc. of Cary, N.C., USA. Data mining and data analytics is applicable in a wide variety of industries.

Training application 122 may be implemented as a Web application. For example, training application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Documents 124 may include a plurality of documents. Classification training device 100 may receive the documents as text or voice that is converted to text using voice recognition. Example documents include a text, a tweet, an email, a magazine, a magazine article, a newspaper, a newspaper article, etc. Each document may be associated with a target variable value $y_i$ that indicates a label or class or other characteristic defined for the respective document $d_i$ for $i=1, 2, \ldots, N_c$, where $N_c$ is a number of the documents included in documents 124. Documents 124 have been labeled or classified, for example, by a human or other machine learning labeling process. For example, the label or classification may indicate a class for the document or otherwise indicate an identification of a characteristic of the document such as a sentiment, a spam indicator, a document type such as a newspaper article section associated with the document, etc. Documents 124 may be stored in a database that includes the text of the document or a link to the text of the document with the $y_i$ target variable value.

A document stored in documents 124 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. For example, data stored in documents 124 may be generated as part of the Internet of Things (IoT), where things (e.g., machines, devices, phones, sensors) can be connected to networks and the data from these things collected and processed within the things and/or external to the things before being stored in documents 124. For example, the IoT can include a microphone and/or store text entered into the IoT or received by the IoT. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in documents 124.

The data stored in documents 124 may include any type of content represented in any computer-readable format such as binary, alphanumeric, numeric, string, markup language, etc. The content may include textual information, audio information, numeric information, etc. that further may be encoded using various encoding techniques as understood by a person of skill in the art. The audio information may be converted to text.

Documents 124 may be stored on computer-readable medium 108 or on one or more computer-readable media of distributed computing system 128 and accessed by classification device 100 using communication interface 106 and/or input interface 102. Documents 124 may be stored in various compressed formats. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of documents that can be processed by one or more SAS software tools.

Documents 124 may be stored using various data structures as known to those skilled in the art including one or more files of a file system, a relational database, one or more tables of a system of tables, a structured query language database, etc. on classification device 100 or on distributed computing system 128. Classification device 100 may coordinate access to documents 124 that is distributed across distributed computing system 128 that may include one or more computing devices. For example, documents 124 may be stored in a cube distributed across a grid of computers as understood by a person of skill in the art. As another example, documents 124 may be stored in a multi-node Hadoop® class. For instance, Apache™ Hadoop® is an open-source software framework for distributed computing supported by the Apache Software Foundation. As another example, documents 124 may be stored in a cloud of computers and accessed using cloud computing technologies, as understood by a person of skill in the art. The SAS® LASR™ Analytic Server may be used as an analytic platform to enable multiple users to concurrently access data stored in documents 124. The SAS Viya open, cloud-ready, in-memory architecture also may be used as an analytic platform to enable multiple users to concurrently access data stored in documents 124. SAS CAS may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Figure 2A:
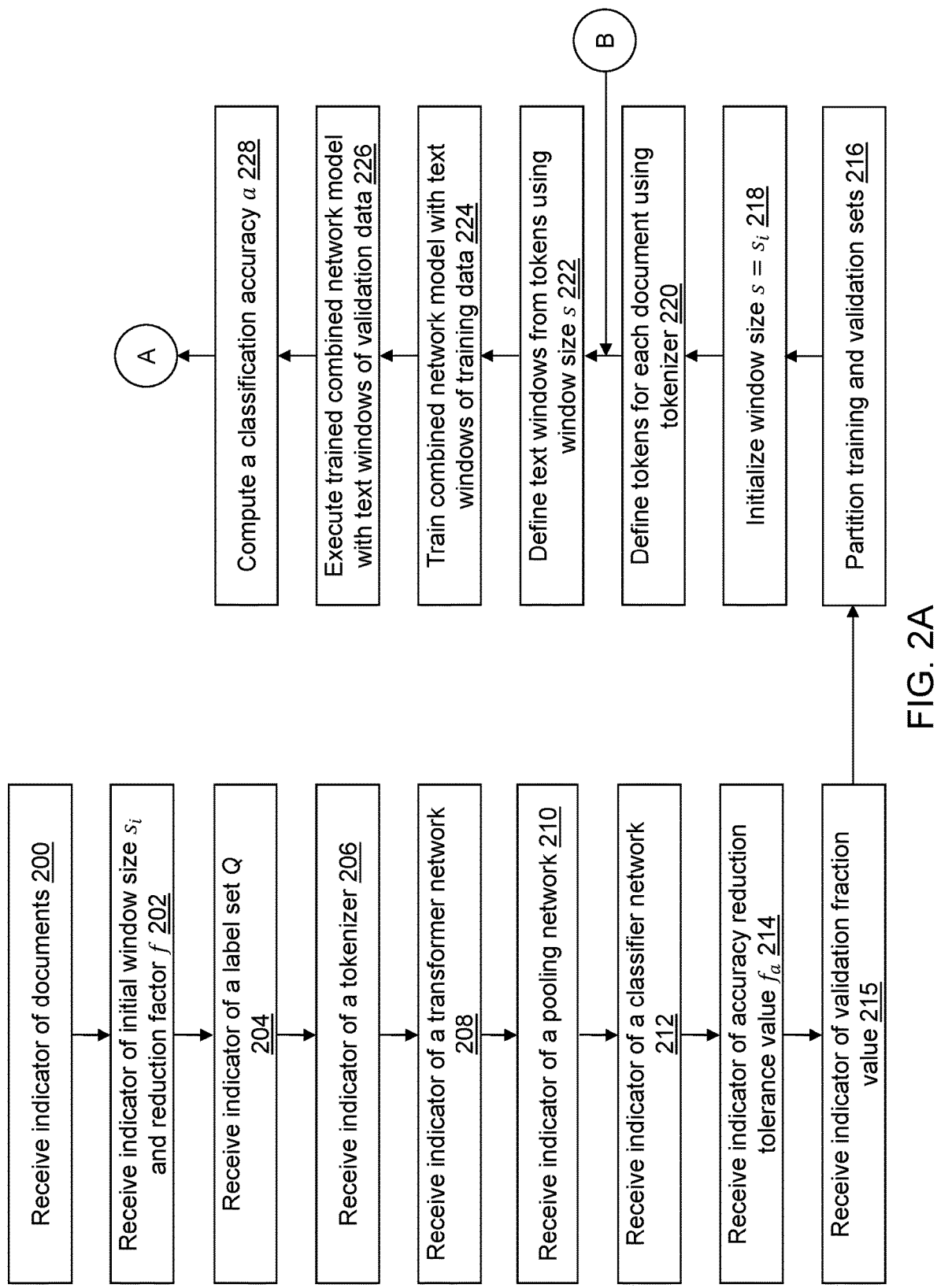
FIGS. 2A and 2B depict a flow diagram illustrating examples of operations performed by the classification training device of FIG. 1 in accordance with an illustrative embodiment.
Figure 2B:
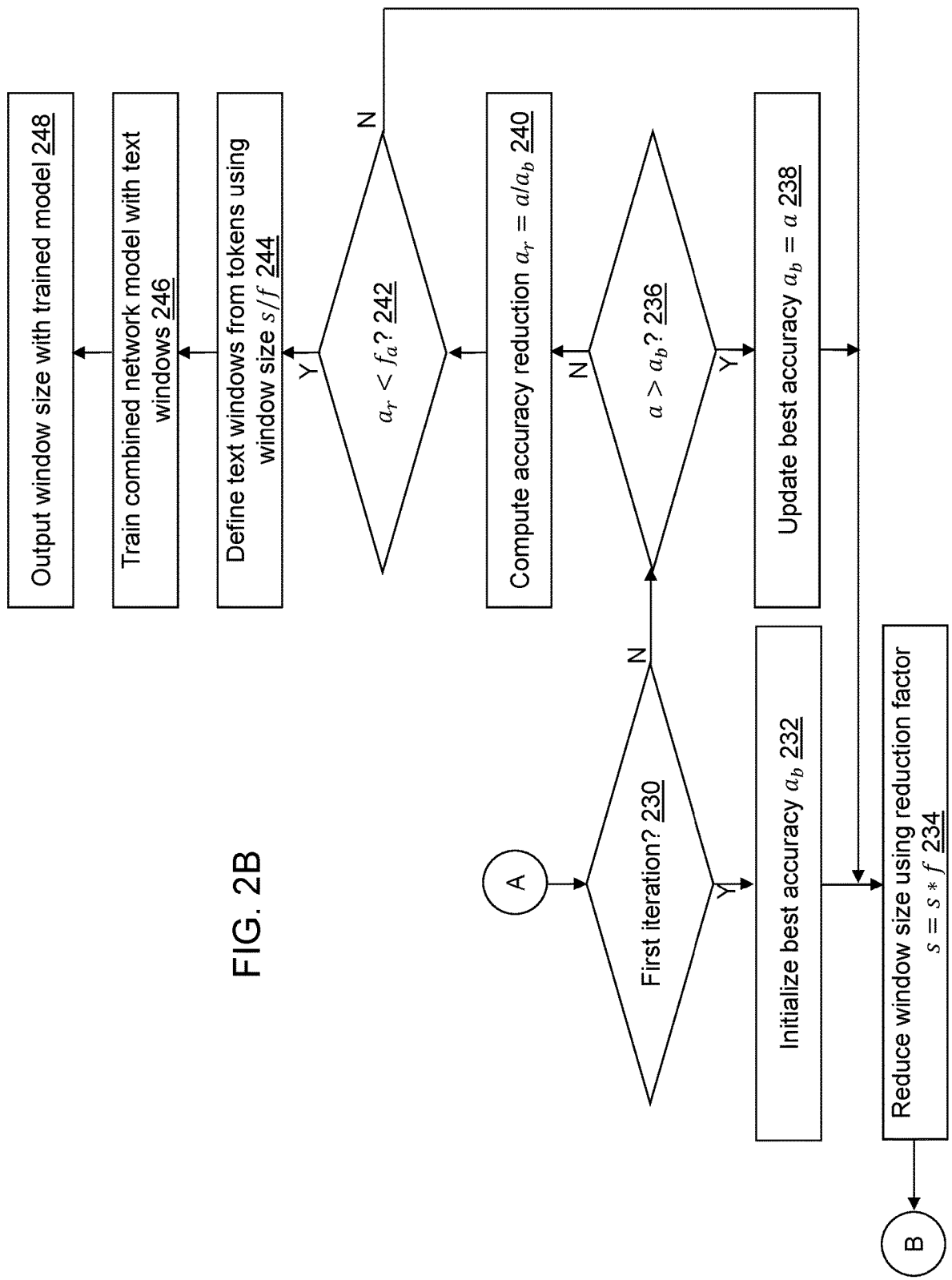

Referring to FIGS. 2A and 2B, example operations associated with training application 122 are described. Additional, fewer, or different operations may be performed depending on the embodiment of training application 122. The order of presentation of the operations of FIGS. 2A and 2B is not intended to be limiting. Although some of the operational flows are presented in sequence, the various operations may be performed in various repetitions, concurrently (in parallel, for example, using threads and/or a distributed computing system), and/or in other orders than those that are illustrated. For example, a user may execute or trigger execution of training application 122, which causes presentation of a first user interface window, which may include a plurality of menus and selectors such as drop-down menus, buttons, text boxes, hyperlinks, etc. associated with training application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by training application 122. For example, instead of receiving input through a user interface, the input may be read from a file stored on computer-readable medium 108 and/or on another computing system.

Referring to FIGS. 2A through 2C, example operations associated with classification application 122 are described. Additional, fewer, or different operations may be performed depending on the embodiment of classification application 122. The order of presentation of the operations of FIGS. 2A through 2C is not intended to be limiting. Some of the operations may not be performed in some embodiments. Although some of the operational flows are presented in sequence, the various operations may be performed in various repetitions and/or in other orders than those that are illustrated. For example, a user may execute classification application 122, which causes presentation of a first user interface window, which may include a plurality of menus and selectors such as drop-down menus, buttons, text boxes, hyperlinks, etc. associated with classification application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by classification application 122. Some of the operational flows further may be performed in parallel, for example, using a plurality of threads and/or a plurality of computing devices such as may be included in distributed computing system 136.

Referring to FIG. 2A, in an operation 200, a first indicator may be received that indicates documents 124. For example, the first indicator indicates a location and a name of documents 124. As an example, the first indicator may be received by classification application 122 after selection from a user interface window or after entry by a user into a user interface window. In an alternative embodiment, documents 124 may not be selectable. For example, a most recently created dataset may be used automatically. The first indicator further may indicate a number of the plurality of documents to select from documents 124 to define documents 124. For example, the first indicator may indicate the number of the plurality of documents to select randomly or in order, may indicate to use all of the plurality of documents, may indicate a percentage of the plurality of documents to select randomly or in order, etc. When not specified using the first indicator, a predefined number of the plurality of documents may be selected randomly, all of the plurality of documents may be used automatically, or a predefined percentage of the plurality of documents may be selected randomly. The first indicator may further indicate a column number or a column name that stores the value for $y_i$ for each document of documents 124. As another option, the first or the last column may be assumed to include the value for $y_i$. As another option, the value for $y_i$ may be stored in a file with an associated document link or document name/location. Each document may include a plurality of words included in one or more sentences that are included in one or more paragraphs, etc.

In an operation 202, a second indicator may be received that indicates an initial window size $s_i$ and/or a reduction factor f. The initial window size $s_i$ indicates a number of tokens read from each document to include in a text window to be processed. The reduction factor f indicates an amount to reduce a current window size each iteration. In an alternative embodiment, the second indicator may not be received. For example, default values may be stored, for example, in computer-readable medium 108 and used automatically. In another alternative embodiment, the values of the initial window size $s_i$ and/or the reduction factor f may not be selectable. Instead, fixed, predefined values may be used. For illustration, a default value of the initial window size $s_i$ may be 512. For illustration, a default value of the reduction factor f may be 0.5, which indicates that the current window size is reduced by half each iteration.

In an operation 204, a third indicator may be received that indicates a label set Q associated with documents 124. For example, the label set Q includes a list of permissible values that the $y_i$-variable (target) value may have for each document. For illustration, if sentiment analysis is performed, the label set Q may include c=4 permissible values that may be indicated as Q={1, ... , c}, where c is a number of classes included in the label set Q, and Q=1 may be associated with a "positive" class, Q=2 may be associated with a "negative" class, Q=3 may be associated with a "mixed" class, and Q=4 may be associated with a "neutral" class though other class definitions may be defined depending on the embodiment. The label set Q further may be a binary indicator that indicates the existence or non-existence of a characteristic of each document such as spam or not spam.

In an alternative embodiment, the third indicator may not be received and/or selectable. For example, the number of classes c and label set Q may be determined automatically by identifying unique values of the $y_i$-variable included in document 124 and including them in label set Q, where c is the number of classes included in label set Q.

In an operation 206, a fourth indicator of a tokenizer to execute is received. For example, the fourth indicator indicates a name of a tokenizer. A tokenizer reads each document of documents 124 indicated in operation 200 and defines a plurality of tokens for each. A token is a string of contiguous characters between two spaces, a string of contiguous characters between a space and a punctuation mark, a number with a colon such as a time 2:00, etc. The contiguous characters may include numeric as well as text values. Symbols that are not a punctuation mark may be tokens themselves except optionally apostrophes and hyphens in a word with no space, which in many cases symbolize acronyms or citations. A token can present a single word or a group of words and can be defined to process any language. The fourth indicator may be received by classification application 122 after selection from a user interface window or after entry by a user into a user interface window. A default value for the tokenizer to execute may further be stored, for example, in computer-readable medium 108. In an alternative embodiment, the tokenizer may not be selectable and a single, predefined tokenizer is used. An example tokenizer includes a SentencePiece algorithm described in a paper by Taku Kudo and John Richardson titled SentencePiece: A simple and language independent subword tokenizer and detokenizer for Neural Text Processing and published in 2012.

In an operation 208, a fifth indicator of a transformer network to execute is received. For example, the fifth indicator indicates a name of a transformer network that may have been pretrained to define its hyperparameters. A transformer network receives a number of the plurality of tokens based on the current window size and defines a class for each window of tokens that may be different than the classes defined by label set Q. The fifth indicator may be received by classification application 122 after selection from a user interface window or after entry by a user into a user interface window. A default value for the transformer network to execute may further be stored, for example, in computer-readable medium 108. In an alternative embodiment, the transformer network may not be selectable and a single, predefined transformer network is used. Example transformer networks include a BERT transformer network, an XLNet transformer network, a RoBERTa transformer network, a Distilbert transformer network, etc. For illustration, the BERT transformer network is a bidirectional encoder representations from transformers network (BERT) described in a paper by Jacob Devlin et al. published May 24, 2019 titled BERT: Pre-training of Deep Bidirectional Transformers for Language Understanding, in a paper by Ashutosh Adhikari et al. titled DocBERT: BERT for Document Classification published at arXiv:1904.08398 Aug. 22, 2019, in a paper by Doug Cairns and Xiangxiang Meng titled NLP with BERT: Sentiment Analysis Using SAS® Deep Learning and DLPy published as paper SAS4429-2020 (Apr. 8, 2020). For illustration, the XLNet transformer network is an auto-regressive language model that outputs a joint probability of a sequence of tokens based on a transformer architecture with recurrence described in a paper by G. McGoldrick et al. titled Understanding XLNet published Jul. 10, 2019. For illustration, the RoBERTa transformer network is a BERT transformer network robustly optimized through pretraining as described in a paper by Yinhan Liu et al. titled A Robustly Optimized BERT Pretraining Approach published at arXiv:1907.11692 Jul. 26, 2019. For illustration, the Distilbert transformer network is a BERT transformer network described in a paper by Victor Sahn et al. titled DistilBERT, a distilled version of BERT: smaller, faster, cheaper and lighter published at arXiv:1910.01108 Mar. 1, 2020.

A transformer is based on an attention mechanism that is an adaptive weighting scheme. The output of an attention mechanism for sequence element n is a weighted sum of all of the input sequence elements. A transformer differs from a recurrent neural network (RNN) in that all sequence elements are considered simultaneously. As an example, BERT combines language model pretraining and the transformer architecture to support an array of natural language processing (NLP) problems. Transfer learning can be applied to a pretrained transformer network, such as the BERT model, to fine-tune it for a specific NLP problem such as sentiment analysis of documents.

A BERT model has three main sections. The lowest layers are the embedding section that is composed of three separate embedding layers followed by an addition layer and a normalization layer. A next section is a transformer encoder section that typically consists of N encoder blocks connected sequentially (that is, output of encoder block 1 connects to input of encoder block 2, . . . , output of encoder block N−1 connects to input of encoder block N).

The embedding section uses the token, its position, or its segment value associated with each token as a key to extract a corresponding embedding vector from a dictionary or lookup table. The embedding vectors are summed and normalized. For example, a token embedding layer maps token input values to an embedding vector, a position embedding layer maps position input values to a position embedding vector, and a segment embedding layer maps the segment value to one of two segment embedding vectors.

Each encoder block includes addition and normalization layers, and two composite layers, called feedforward and multi-head attention. The feedforward layer consists of two back-to-back fully connected (or dense) layers, where each input neuron is connected to all output neurons. Multi-head attention uses three input matrices, $X_Q$, $X_K$, and $X_V$, where each row is a vector of dimension D that corresponds to a token from a tokenized text string. A first row represents A first token in the string, A second row represents A second token, and so on. $X_Q$, $X_K$, and $X_V$ may be referred to as the query, key, and value matrix inputs, respectively. For illustration, the BERT transformer network uses self-attention (that is, $X_Q=X_K=X_V$). An attention head projects the query, key, and value matrix inputs to independent lower-dimensional subspaces followed by scaled dot-product attention.

In an operation 210, a sixth indicator of a pooling network to execute is received. For example, the sixth indicator indicates a name of a pooling network. The pooling network receives the class outputs from the transformer network for each window of tokens and pools them together for each document. For example, a first token output from the transformer network referred to as a "CLS" token may be input to the pooling network that combines the "CLS" token for each text window of the entire document. The sixth indicator may be received by classification application 122 after selection from a user interface window or after entry by a user into a user interface window. A default value for the pooling network to execute may further be stored, for example, in computer-readable medium 108. In an alternative embodiment, the pooling network may not be selectable and a single, predefined pooling network is used. In pooling for NLP, all tokens are pooled simultaneously, resulting in a fixed-length output regardless of the length of the input. Example pooling networks include a maximum pooling network, a mean pooling network, a recurrent neural network (RNN) pooling network, an attention pooling network, etc.

In an operation 212, a seventh indicator of a classifier network to execute is received. For example, the seventh indicator indicates a name of a classifier network. The classifier network receives the pooled class outputs from the pooling network for each document. The seventh indicator may be received by classification application 122 after selection from a user interface window or after entry by a user into a user interface window. A default value for the classifier network to execute may further be stored, for example, in computer-readable medium 108. In an alternative embodiment, the classifier network may not be selectable and a single, predefined classifier network is used. Example classifier networks include a fully connected layer in which a number of output neurons is equal to a number of classes.

The fifth indicator, the sixth indicator, and the seventh indicator together define an architecture of a combined network model such as a neural network comprised of a plurality of connected layers to be trained together to predict a value for the target variable. For illustration, the architecture defines a plurality of layers and their connectivity including a type of each layer. Illustrative layers include an input layer, a convolution layer, a pooling layer, an output layer, etc. One or more hyperparameters may be defined for each layer that may vary based on a type of each layer. For example, an activation function, a number of neurons, a number of groups, a dropout rate, a height and/or a width of a convolution window, a number of filters, an initialization method for filter weights, width and height padding dimensions, a number of categories or labels or unique values of the target variable value $y_i$, a detection threshold, etc. may be defined as hyperparameters for training the combined network model. The architecture may define a convolutional neural network, a deep, fully connected neural network, and/or a recurrent neural network.

An automatic tuning method (autotune option) may be specified with one or more values or ranges of values to evaluate for each hyperparameter by the fifth indicator, the sixth indicator, and/or the seventh indicator. The automatic tuning process may be used to identify the best settings for the hyperparameters though the hyperparameters may optionally be selected as an input option by a user.

Training requires the selection of an optimization algorithm along with associated training hyperparameters. The fifth indicator, the sixth indicator, and the seventh indicator may further include an indicator of the optimization algorithm and its associated training hyperparameters. For illustration, the paper by Doug Cairns and Xiangxiang Meng titled NLP with BERT: Sentiment Analysis Using SAS® Deep Learning and DLPy provides an illustrative optimization algorithm along with associated training hyperparameters.

In an operation 214, an eighth indicator of an accuracy reduction tolerance value $f_a$ may be received. In an alternative embodiment, the eighth indicator may not be received. For example, a default value may be stored, for example, in computer-readable medium 108 and used automatically. In another alternative embodiment, the value of the accuracy reduction tolerance value $f_a$ may not be selectable. Instead, a fixed, predefined value may be used. For illustration, a default value of the accuracy reduction tolerance value $f_a$ may be 0.01 though any value greater than zero and less than one may be used.

In an operation 215, a ninth indicator of a validation fraction value $f_v$ may be received. The validation fraction value $f_v$ defines a fraction value for a fraction of a number of documents in documents 124 indicated in operation 200 to be used for validation. In an alternative embodiment, the ninth indicator may not be received. For example, a default value may be stored, for example, in computer-readable medium 108 and used automatically. In another alternative embodiment, the value of the validation fraction value $f_v$ may not be selectable. Instead, a fixed, predefined value may be used. For illustration, a default value of the validation fraction value may be 0.8 though any value may be used.

In an operation 216, documents from documents 124 indicated in operation 200 are partitioned into a training set and a validation set.

In an operation 218, a window size s is initialized, for example, using $s=s_i$, where $s_i$ is the initial window size indicated in operation 202.

In an operation 220, documents from documents 124 indicated in operation 200 are input to the tokenizer indicated in operation 206 to split the text into meaningful phrase, word, or subword units.

In an operation 222, the tokens are grouped into successive text windows that are associated with a respective document. Each text window includes a number of tokens defined by the window size s. When a document is complete, and there are remaining tokens to complete a last text window having the window size s for the respective document, the last text window for the respective document is padded to include blank spaces until the number of tokens defined by the window size s is reached. For example, an illustrative document includes the text "What is the weather forecast? Rain is expected.", which can define the following text window that only includes 13 tokens.

| Token    | [CLS] | what | is | the | weather | fore | ##cast | ? | [SEP] |
|----------|-------|------|----|----|---------|------|--------|---|-------|
| Position | 0     | 1    | 2  | 3  | 4       | 5    | 6      | 7 | 8     |
| Segment  | A     | A    | A  | A  | A       | A    | A      | A | A     |

| Token    | rain | is | expected | . | [SEP] |
|----------|------|----|----|---|-------|
| Position | 9    | 10 | 11 | 12 | 13   |
| Segment  | B    | B  | B  | B | B     |

A classification token ([CLS]) begins each text window string, and a separation token ([SEP]) concludes each sentence. Some words (such as forecast) can be split as part of the tokenization process, for example, based on rules of the tokenizer such as the SentencePiece algorithm. Tokens in the first sentence are associated with segment A, while tokens in the second sentence are associated with segment B. The document may include additional sentences to complete the text window having the window size s or blank spaces are added to complete the text window for the document. A document may be stored in one or more text windows that are created in textual order from the document text.

Figure 6:
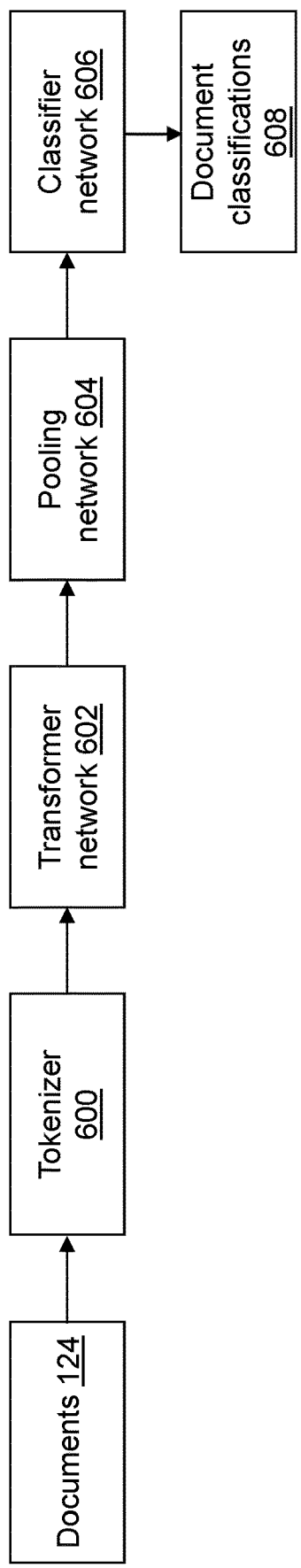
FIG. 6 depicts a block diagram of a network model in accordance with an illustrative embodiment.

In an operation 224, the transformer network indicated in operation 208, the pooling network indicated in operation 210, and the classifier network indicated in operation 212 are combined to define a combined network model that is trained using the text windows defined from the training set partition based on the various hyperparameters or tuning parameters defined using the fifth, sixth, and/or seventh indicators or by default. For example, for training deep learning models, stochastic gradient descent is a widely used optimization method with variants such as ADAM-SGD and Momentum-SGD. For illustration, referring to FIG. 6, documents 124 are converted to tokens using a tokenizer 600. The tokens are converted into fixed size text windows that are input to a transformer network 602 that provides input to a pooling network 604 that provides input to a classifier network 606 that outputs document classifications 608.

In an operation 226, the validation set partition of documents is input to the trained combined network model to predict a class for each document.

In an operation 228, a classification accuracy a is computed based on a comparison of the class predicted for each document relative to a predetermined class assigned to the document. For illustration, Referring to FIG. 2B, in an operation 230, a determination is made concerning whether this is a first iteration of operation 230. When this is a first iteration of operation 230, processing continues in an operation 232. When this is not a first iteration of operation 230, processing continues in an operation 236.

In operation 232, a best accuracy $a_b$ is initialized, for example, using $a_b=a$.

In an operation 234, the window size s is reduced using the reduction factor f, for example, as s=s*f, and processing continues in operation 222 to train the combined network model with text windows defined using the reduced window size s.

In operation 236, a determination is made concerning whether the most recently computed accuracy a is better than the best accuracy $a_b$. When $a > a_b$, processing continues in an operation 238. When $a \le a_b$, processing continues in an operation 240.

In operation 238, the best accuracy $a_b$ is updated, for example, using $a_b=a$, and processing continues in operation 234.

In operation 240, an accuracy reduction value $a_r$ is computed, for example, using $a_r=1-a/a_b$.

In operation 242, a determination is made concerning whether the accuracy reduction value $a_r$ exceeds the accuracy reduction tolerance value $f_a$. When $a_r < f_a$, processing continues in an operation 244. When $a_r \ge f_a$, processing continues in operation 234 to compute an effect of a reduced window size because the accuracy reduction still exceeds the accuracy reduction tolerance value $f_a$.

In operation 244, the tokens are grouped into successive text windows that are associated with a respective document where each text window includes a number of tokens defined by an increased window size s=s/f because the last window size reduction resulted in an accuracy below that requested based on the maximum accuracy reduction maximum accuracy $f_a$.

In an operation 246, the defined, combined network model is trained using the text windows defined from the training set partition with the text windows defined using the increased window size in operation 244. In an alternative embodiment, operations 244 and 246 need not be performed if the model trained in each iteration of operation 224 is stored until a next reduced window size results in an accuracy above that requested based on the maximum accuracy reduction maximum accuracy $f_a$.

In an operation 248, the combined network model trained using the increased window size in operation 244 including the increased window size is output. For example, a model description of the combined network model may be output to classification model 126. For illustration, the trained combined network model may be stored using the ASTORE procedure provided by SAS® Visual Data Mining and Machine Learning software.

Figure 5A:
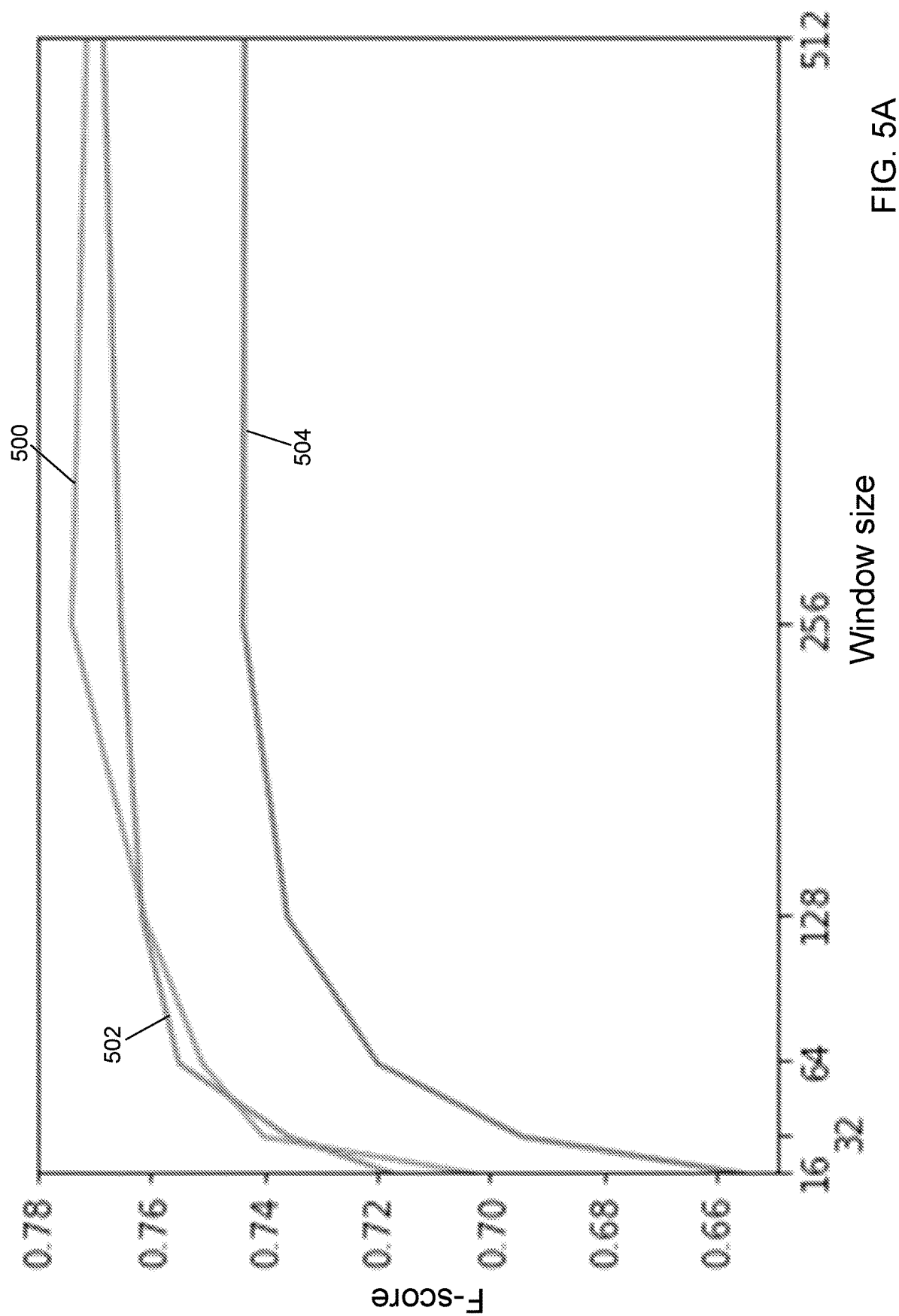
FIG. 5A shows an accuracy as a function of a window size for three different network models in accordance with an illustrative embodiment.

Referring to FIG. 5A, an f-score accuracy value as a function of the window size s is shown. Documents 124 included a sample of 7,031 reviews taken from the Norwegian Review Corpus NoReC. The reviews tended to be long and vary considerably in length, with a mean of 749 BERT sub-word tokens and a standard deviation of 485. A first accuracy curve 500 is shown based on use of the BERT transformer network with a maximum pooling network. A second accuracy curve 502 is shown based on use of the BERT transformer network with a mean pooling network. A third accuracy curve 504 is shown based on use of the BERT transformer network with an RNN pooling network. Table 1 below also summarizes the accuracy results.

TABLE 1

| Windows Size s | Maximum | Mean | RNN |
|---|---|---|---|
| 16 | 0.7 | 0.72 | 0.66 |
| 32 | 0.74 | 0.74 | 0.69 |
| 64 | 0.75 | 0.75 | 0.72 |
| 128 | 0.76 | 0.76 | 0.74 |
| 256 | 0.77 | 0.77 | 0.74 |
| 512 | 0.77 | 0.77 | 0.74 |

Reducing the window size s from 512 to 16 using the mean pooling network resulted in an accuracy reduction of only $$0.72/0.77 = a_r = \frac{0.72}{0.77} = .9351.$$

Reducing the text window size results in very little loss in accuracy but a significant reduction in runtime because the self-attention model of the transformer network compares each token in its window to itself and every other token. This means that by window length, runtime increases quadratically. Therefore, when a window is reduced in size, the processing runtime is decreased.

Figure 5B:
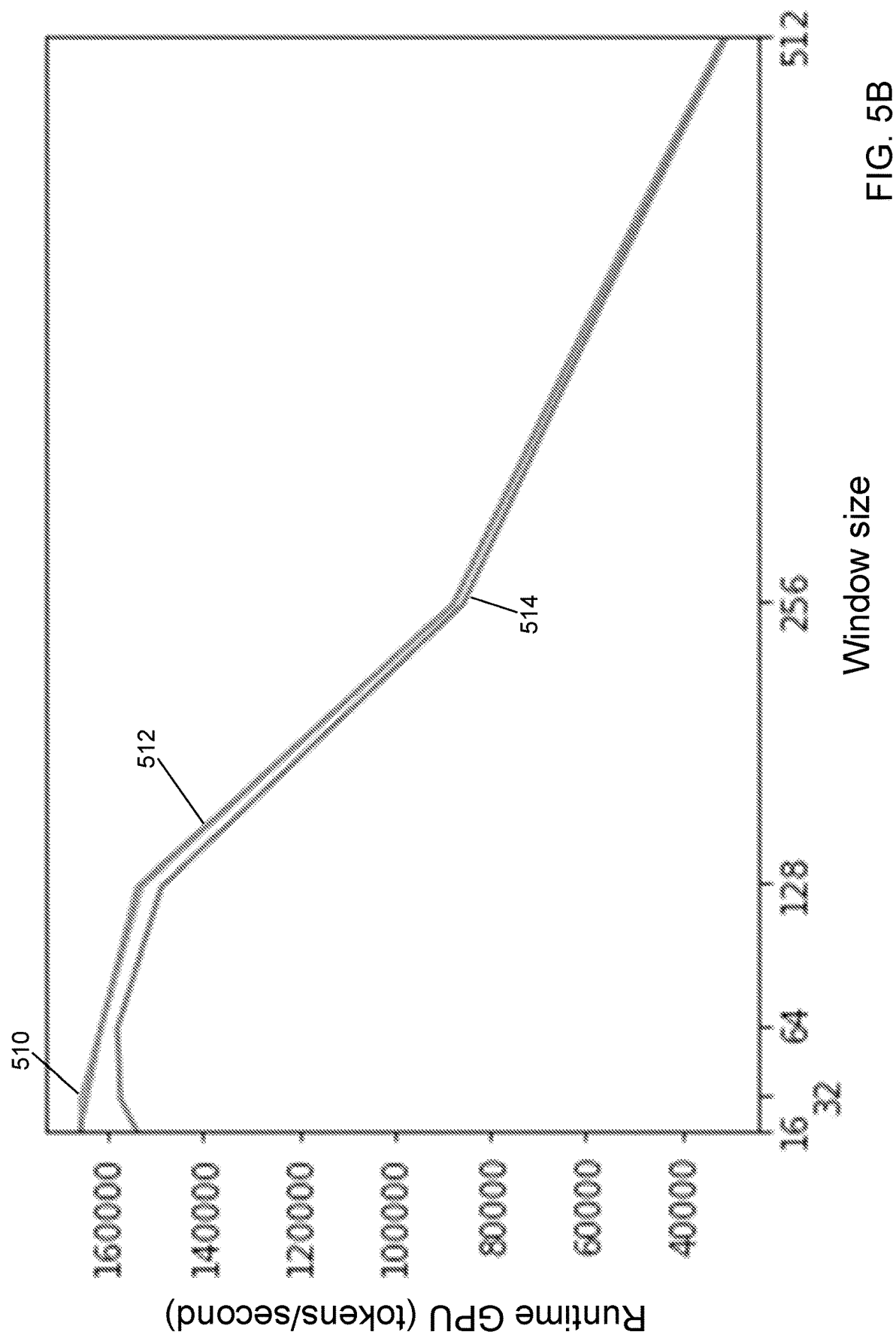
FIG. 5B shows a runtime as a function of the window size for the three different network models of FIG. 5A using a graphics processing unit in accordance with an illustrative embodiment.

For example, referring to FIG. 5B, a runtime as a function of the window size s is shown using a GPU. A first GPU runtime curve 510 is shown based on use of the BERT transformer network with the maximum pooling network. A second GPU runtime curve 512 is shown based on use of the BERT transformer network with the mean pooling network. A third GPU runtime curve 514 is shown based on use of the BERT transformer network with the RNN pooling network. Table 2 below summarizes a relative speed increase relative to using the window size equal to 512 with the GPU.

TABLE 2

| Windows Size s | Maximum | Mean | RNN |
|---|---|---|---|
| 16 | 2.5 | 2.6 | 2.4 |
| 32 | 2.4 | 2.5 | 2.3 |
| 64 | 2.2 | 2.3 | 2.2 |
| 128 | 2 | 2 | 1.9 |
| 256 | 1.5 | 1.5 | 1.5 |
| 512 | 1 | 1 | 1 |

Thus, for example, using a windows size s=256 resulted in a 1.5 times relative speed increase with a negligible loss in accuracy. Using a windows size s=16 resulted in a loss in accuracy of 6.5%, but with a 2.6 times relative speed increase using the GPU.

Figure 5C:
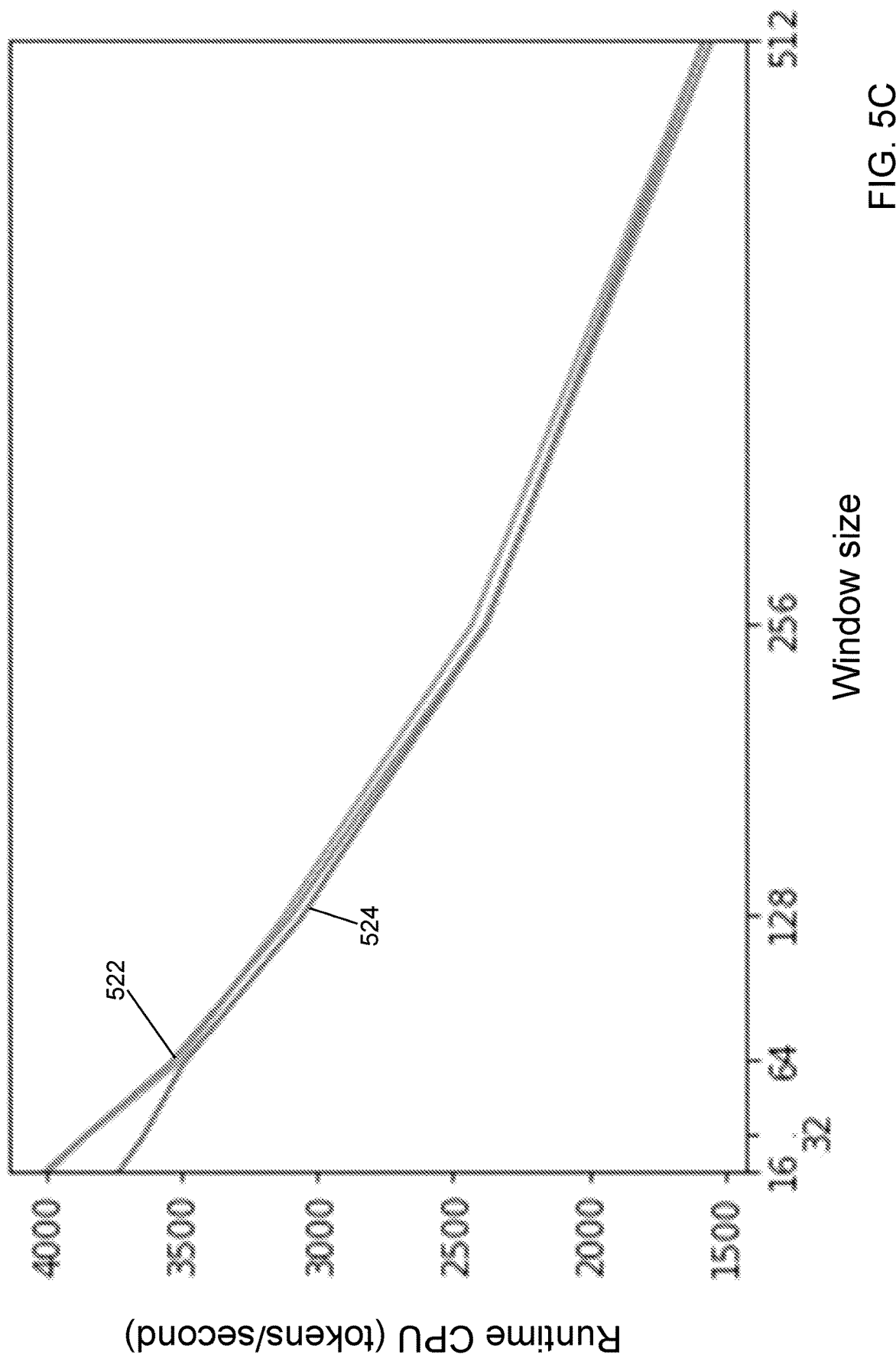
FIG. 5C shows a runtime as a function of the window size for the three different network models of FIG. 5A using a central processing unit in accordance with an illustrative embodiment.

For example, referring to FIG. 5C, a runtime as a function of the window sizes is shown using a CPU. A first CPU runtime curve 510 is shown based on use of the BERT transformer network with the maximum pooling network. A second CPU runtime curve 512 is shown based on use of the BERT transformer network with the mean pooling network. A third CPU runtime curve 514 is shown based on use of the BERT transformer network with the RNN pooling network. Table 3 below summarizes a relative speed increase relative to using the window size equal to 512 with the CPU.

TABLE 3

| Windows Size s | Maximum | Mean | RNN |
|---|---|---|---|
| 16 | 5.23 | 5.25 | 4.94 |
| 32 | 5.24 | 5.2 | 5.06 |
| 64 | 5.11 | 5.1 | 5.08 |
| 128 | 4.84 | 4.86 | 4.79 |
| 256 | 2.78 | 2.77 | 2.76 |
| 512 | 1 | 1 | 1 |

Using a mean pooling network and a windows size s=16 resulted in a loss in accuracy of 6.5%, but with a 5.25 times relative speed increase using the CPU.

Figure 3:
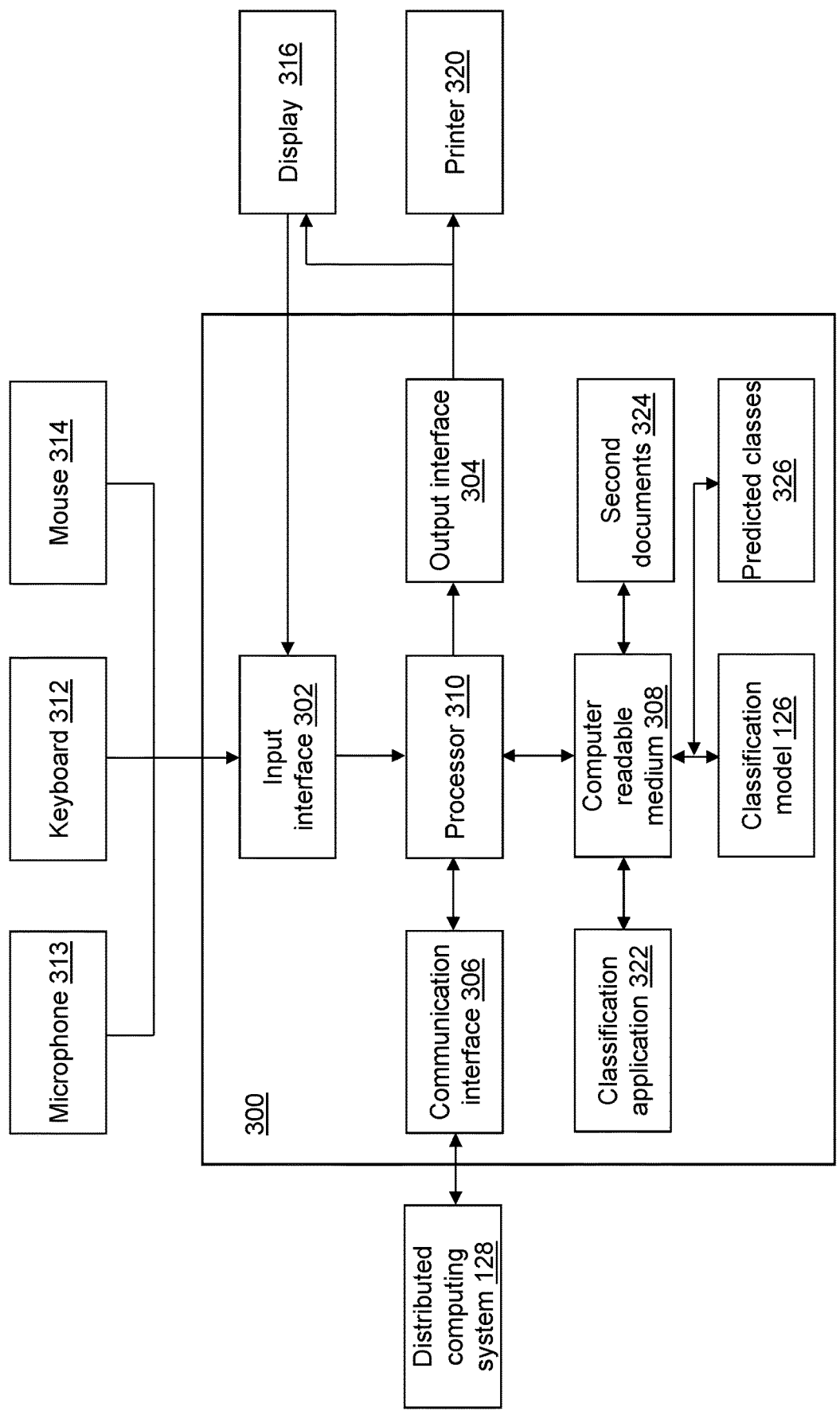
FIG. 3 depicts a block diagram of a classification device in accordance with an illustrative embodiment.

Referring to FIG. 3, a block diagram of a classification device 300 is shown in accordance with an example embodiment. Classification device 300 applies the trained, combined network model to second documents 324 that have not been classified. Classification device 300 may include a second input interface 302, a second output interface 304, a second communication interface 306, a second non-transitory computer-readable medium 308, a second processor 310, a classification application 322, second documents 324, predicted classes 326, and classification model 126. Fewer, different, and additional components may be incorporated into classification device 300.

Second input interface 302 provides the same or similar functionality as that described with reference to input interface 102 of classification training device 100 though referring to classification device 300. Second output interface 304 provides the same or similar functionality as that described with reference to output interface 104 of classification training device 100 though referring to classification device 300. Second communication interface 306 provides the same or similar functionality as that described with reference to communication interface 106 of classification training device 100 though referring to classification device 300. Data and messages may be transferred between classification device 300 and distributed computing system 128 or classification training device 100 using second communication interface 306. Second computer-readable medium 308 provides the same or similar functionality as that described with reference to computer-readable medium 108 of classification training device 100 though referring to classification device 300. Second processor 310 provides the same or similar functionality as that described with reference to processor 110 of classification training device 100 though referring to classification device 300.

Classification application 322 performs operations associated with classifying or predicting a characteristic value related to each document included in second documents 324. The predicted characteristic value or class may be stored in predicted classes 326 to support various data analysis functions. Some or all of the operations described herein may be embodied in classification application 322. The operations may be implemented using hardware, firmware, software, or any combination of these methods.

Referring to the example embodiment of FIG. 3, classification application 322 is implemented in software (comprised of computer-readable and/or computer-executable instructions) stored in second computer-readable medium 308 and accessible by second processor 310 for execution of the instructions that embody the operations of classification application 322. Classification application 322 may be written using one or more programming languages, assembly languages, scripting languages, etc. Classification application 322 may be implemented as a Web application.

Classification application 322 may be integrated with other analytic tools. As an example, classification application 322 may be part of an integrated data analytics software application and/or software architecture such as that offered by SAS Institute Inc. of Cary, N.C., USA. For example, classification application 322 may be part of SAS® Enterprise Miner™ developed and provided by SAS Institute Inc. of Cary, N.C., USA. Merely for further illustration, classification application 322 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Visual Analytics, SAS® Viya™, SAS In-Memory Statistics for Hadoop®, all of which are developed and provided by SAS Institute Inc. of Cary, N.C., USA.

One or more operations of classification application 322 further may be performed by an ESPE on an event stream instead of reading observation vectors from second documents 324. Classification application 322 and training application 122 may be the same or different applications that are integrated in various manners to train a combined network model using documents 124 that may be distributed on distributed computing system 128 and to execute the trained combined network model to predict the characteristic of each document included in second documents 324 that may be distributed on distributed computing system 128.

Documents 124 and second documents 324 may be generated, stored, and accessed using the same or different mechanisms. The target variable is not defined in second documents 324. Similar to documents 124, second documents 324 may include a plurality of rows and a plurality of columns with the plurality of rows referred to as observations or records, and the columns referred to as variables that are associated with an observation. Second documents 324 may be transposed.

Similar to documents 124, second documents 324 may be stored on second computer-readable medium 308 or on one or more computer-readable media of distributed computing system 128 and accessed by classification device 300 using second communication interface 306. Second documents 324 may be received through communication interface 306 from distributed computing system 128 or through input interface 302, for example, from a second keyboard 312, a second mouse 314, a second microphone 313, etc. Voice data received through second microphone 313 may be converted to text by a voice recognition system (not shown). Documents stored in second documents 324 may be captured at different time points periodically, intermittently, when an event occurs, etc. Similar to documents 124, documents stored in second documents 324 may be generated as part of the IoT, and some or all data may be pre- or post-processed by an ESPE.

Similar to documents 124, second documents 324 may be stored in various compressed formats. Second documents 324 further may be stored using various structures as known to those skilled in the art including a file system, a relational database, a system of tables, a structured query language database, etc. on classification device 300 and/or on distributed computing system 128. Classification device 300 may coordinate access to second documents 324 that is distributed across a plurality of computing devices that make up distributed computing system 128. For example, second documents 324 may be stored in a cube distributed across a grid of computers as understood by a person of skill in the art. As another example, second documents 324 may be stored in a multi-node Hadoop® cluster. As another example, second documents 324 may be stored in a cloud of computers and accessed using cloud computing technologies, as understood by a person of skill in the art. The SAS® LASR™ Analytic Server and/or SAS® Viya™ may be used as an analytic platform to enable multiple users to concurrently access data stored in second documents 324.

Figure 4:
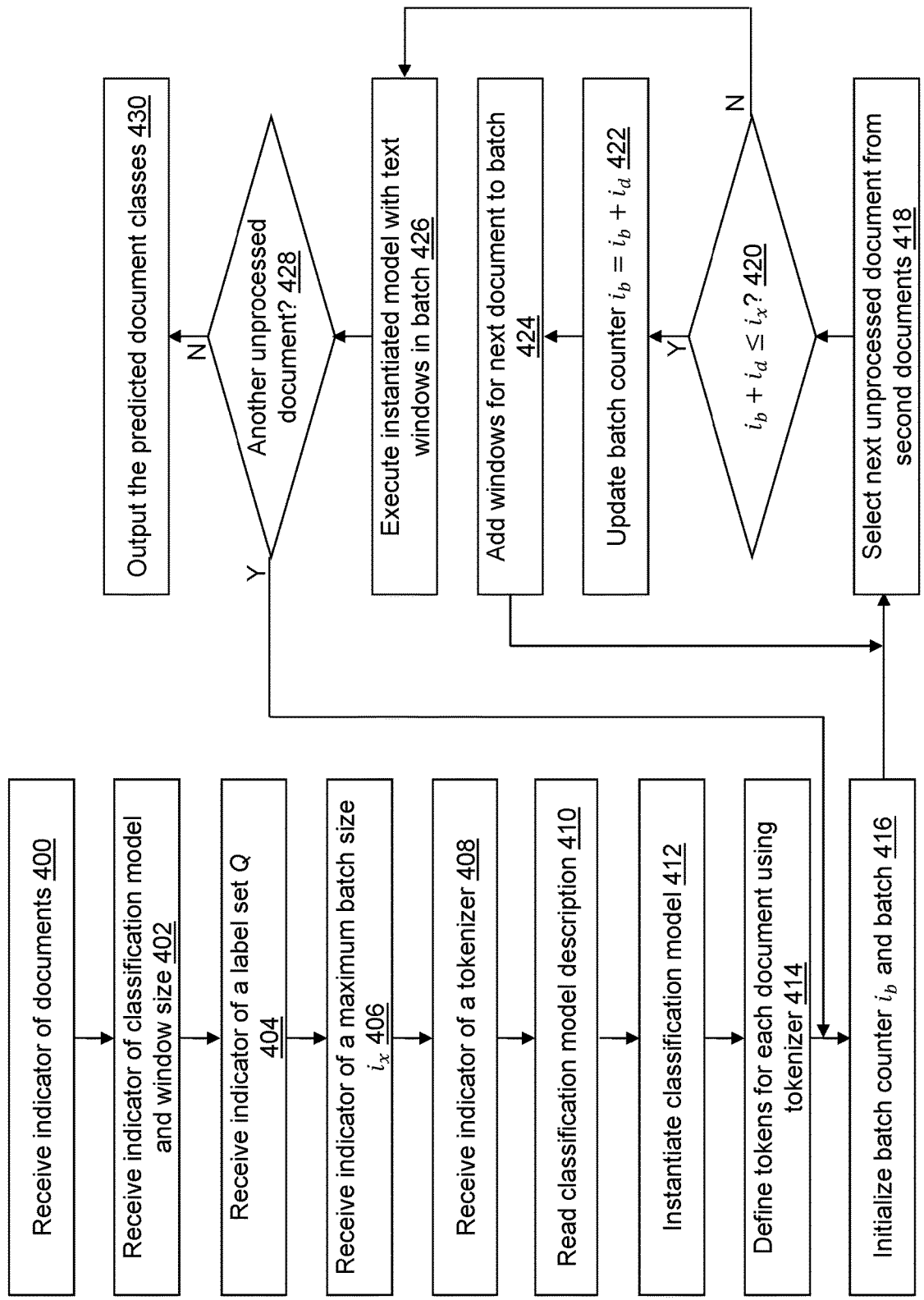
FIG. 4 depicts a flow diagram illustrating examples of operations performed by the classification device of FIG. 3 in accordance with an illustrative embodiment.

Referring to FIG. 4, example operations associated with classification application 322 are described. Additional, fewer, or different operations may be performed depending on the embodiment. The order of presentation of the operations of FIG. 4 is not intended to be limiting. Although some of the operational flows are presented in sequence, the various operations may be performed in various repetitions, concurrently, and/or in other orders than those that are illustrated. As further understood by a person of skill in the art, various operations may be performed in parallel, for example, using a plurality of threads or a plurality of computing devices such as a grid or a cloud of computing devices.

Though shown as a distinct device, in the illustrative embodiment, classification device 300 and classification training device 100 may be the same device. Additionally, classification application 322 may be embedded in training application 122 or may be called by or otherwise integrated with training application 122, for example, using an application programming interface.

In an operation 400, a tenth indicator may be received that indicates second documents 324. For example, the tenth indicator indicates a location and a name of second documents 324. As an example, the tenth indicator may be received by classification application 322 after selection from a user interface window or after entry by a user into a user interface window. In an alternative embodiment, second documents 324 may not be selectable. For example, a most recently created dataset may be used automatically.

In an operation 402, an eleventh indicator may be received that indicates classification model 126. For example, the eleventh indicator indicates a location and a name of classification model 126. As an example, the eleventh indicator may be received by classification application 322 after selection from a user interface window or after entry by a user into a user interface window. In an alternative embodiment, classification model 126 may not be selectable. For example, a most recently created model configuration data may be used automatically. As another example, classification model 126 may be provided automatically as part of integration with classification training application 122.

Similar to operation 204, in an operation 404, a twelfth indicator may be received that indicates the label set Q associated with documents 124.

In an operation 406, a thirteenth indicator may be received that indicates a maximum batch size $i_x$. The maximum batch size $i_x$ indicates a maximum number of text windows to process in a batch. In an alternative embodiment, the thirteenth indicator may not be received. For example, a default value may be stored, for example, in second computer-readable medium 308 and used automatically. In another alternative embodiment, the value of the maximum batch size $i_x$ may not be selectable. Instead, a fixed, predefined value may be used. For illustration, a default value of the maximum batch size $i_x$ may be 45.

Similar to operation 206, in an operation 408, a fourteenth indicator of the tokenizer to execute is received where the tokenizer indicated in operation 206 is the same as that indicated in operation 406.

In an operation 410, a combined network model description is read from classification model 126 that includes the window size.

In an operation 412, a combined network model is instantiated with the combined network model description. For example, the architecture of the combined network model, its hyperparameters, its weight vector, and other characterizing elements are read and used to instantiate a combined network model based on the information output from the training process in operation 248.

In an operation 414, documents from second documents 224 indicated in operation 400 are input to the tokenizer indicated in operation 406 to split the text into meaningful phrase, word, or subword units.

In an operation 416, a batch counter $i_b$ is initialized, for example, using $i_b=1$, and a batch is initialized, for example, to an empty set of text windows.

In an operation 418, a next unprocessed document is selected form second documents 324. For example, on a first iteration of operation 418, a first document is selected. On a subsequent iteration, a document may be selected that was next, but not added to the batch in a previous iteration of an operation 424. The successive text windows that are associated with the next unprocessed document are identified including a number of the successive text windows $i_d$ that are associated with the next unprocessed document. Each text window includes a number of tokens defined by the window size s stored in operation 248 and read from classification model 126 in operation 402. When a document is complete, and there are remaining tokens to complete a last text window having the window size s for the respective document, the last text window for the respective document is padded to include blank spaces until the number of tokens defined by the window size s is reached.

In an operation 420, a determination is made concerning whether the batch counter $i_b$ exceeds the maximum batch size $i_x$ if the successive text windows associated with the next unprocessed document are added to the batch. When $i_b+i_d \leq i_x$, processing continues in an operation 422. When $i_b+i_d > i_x$, processing continues in an operation 426.

In operation 422, the batch counter $i_b$ is updated, for example, using $i_b=i_b+i_d$.

In an operation 424, the $i_d$ text windows defined for the selected next unprocessed document batch are added to the batch, and processing continues in operation 418 to determine if an additional document can be added to the batch.

In operation 426, the batch of text windows are input to the instantiated combined network model to predict a class for each document included in the batch.

In an operation 428, a determination is made concerning whether there are any documents of the second documents 324 that have not been processed by the instantiated model. When there are documents of the second documents 324 that remain unprocessed, processing continues in operation 416. When the second documents 324 have all been processed, processing continues in an operation 430.

In operation 430, the predicted class may be output, for example, by storing the predicted class with the respective document or an indicator of the respective document to predicted classes 326. In addition, or in the alternative, the predicted classed may be presented on second display 316, printed on second printer 320, sent to another computing device using second communication interface 306, etc.

Memory over usage can affect system performance and lead a program to crash. Because documents can vary substantially in length, a batch of N documents does not offer any guarantee of memory usage. By collecting text windows for documents until just before a sum of the text windows exceeds the maximum batch size $i_x$, a maximum memory usage can be efficiently guaranteed.

For example, assuming a normal distribution, roughly seventy percent of the sample of 7,031 reviews taken from the Norwegian Review Corpus NoReC is between 264 and 1234 tokens long. Assuming a window size of 64 tokens, means that the bulk of the data uses between five and twenty text windows to analyze each document. A shortest review was thirteen tokens long resulting in a single text window having the window size 64, and the longest review was four thousand and thirty-two tokens long resulting in a 63 text windows having the window size 64.

In addition to being slow, transformer networks tend to demand a lot of memory, which can overwhelm a system with limited memory available or a GPU's memory if not properly managed. With document-based batching, the naïve solution simply estimates a worst-case scenario. If the available memory can process 256 text windows in memory simultaneously, it may be assumed to be unlikely that ten documents sum to more than 256 text windows because an average of 25 text windows per document would be required. The risk of exceeding or over using the memory is weighed against a desire to maximally utilize the GPU or CPU. In general, a number of documents is underestimated to avoid crashing the program with a memory error.

Classification application 322 avoids the memory usage problem through use of the maximum batch size $i_x$ that is based on a number of text windows instead of a number of documents. Because each text window is a consistent size, there is more consistency in the memory each batch requires. As a result, the memory usage can be better predicted. In addition, by excluding the document that the maximum batch size $i_x$, there is a guaranteed limit to protect from extending beyond the memory limitations.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that, when executed by a computing device, cause the computing device to:

define tokens for each document of a plurality of documents using a tokenizer;

(A) define text windows from the defined tokens based on a window size, where the window size indicates a number of tokens to include in each text window of the text windows, wherein the text windows are defined in a textual order from each document;

(B) train a network model with the defined text windows to define first classification information, wherein the network model includes a transformer network, a pooling network, and a classifier network, wherein the defined text windows are input to the transformer network, wherein a transformer output of the transformer network is input to the pooling network, wherein a pooled output of the pooling network is input to the classifier network, wherein the first classification information is an output of the classifier network;

(C) classify each document of the plurality of documents using the first classification information to define a predicted class for each document;

(D) compute a first accuracy value by comparing the predicted class defined for each document to a predefined class defined for each document;

(E) reduce the window size using a predefined reduction factor value;

(F) define second text windows from the defined tokens based on the reduced window size;

(G) train the network model with the defined second text windows to define second classification information;

(H) classify each document of the plurality of documents using the second classification information to define a second predicted class for each document;

(I) compute a second accuracy value by comparing the second predicted class defined for each document to the predefined class defined for each document;

(J) compute an accuracy reduction value from the computed second accuracy value relative to the first accuracy value;

(K) when the computed accuracy reduction value is greater than or equal to a predefined accuracy reduction tolerance value, repeat (E) through (K) until the computed accuracy reduction value is less than the predefined accuracy reduction tolerance value; and (L) when the computed accuracy reduction value is less than the predefined accuracy reduction tolerance value, increase the window size using the predefined reduction factor value;
define final text windows from the defined tokens based on the increased window size;
train the network model with the defined final text windows; and
output the increased window size and the network model trained with the defined final text windows.

2. The non-transitory computer-readable medium of claim 1, wherein a document of the plurality of documents is selected from a group consisting of an email, a paper, a book, a text message, a chat box conversation, a conversation converted to text, a tweet, and a webpage.

3. The non-transitory computer-readable medium of claim 1, wherein a token of the tokens is selected from the group consisting of a string of contiguous characters between a pair of spaces, a string of contiguous characters between a space and a punctuation mark, and a number with a colon.

4. The non-transitory computer-readable medium of claim 1, wherein a token of the tokens is a single word or a group of words.

5. The non-transitory computer-readable medium of claim 1, wherein the transformer network includes a bidirectional encoder representations from transformers network.

6. The non-transitory computer-readable medium of claim 1, wherein the pooling network is selected from the group consisting of a maximum pooling layer, a mean pooling layer, and a recurrent neural network.

7. The non-transitory computer-readable medium of claim 1, wherein the accuracy reduction value is computed using $$r = 1 - \frac{a}{a_b},$$

where r is me accuracy reduction value, a is the computed second accuracy value, and $a_b$ is the first accuracy value.

8. The non-transitory computer-readable medium of claim 1, wherein the window size is increased using $$S = \frac{s}{f},$$

where s is the window size, and f is the predefined reduction factor value that is greater than zero and less than one.

9. The non-transitory computer-readable medium of claim 1, wherein the window size is reduced using s=s*f, where s is the window size, and f is the predefined reduction factor value that is greater than zero and less than one.

10. The non-transitory computer-readable medium of claim 1, wherein after (I) and before (J), the computer-readable instructions further cause the computing device to update the first accuracy value with the computed second accuracy value when the computed second accuracy value is greater than the first accuracy value, and to repeat (E) through (K) until the computed accuracy reduction value is less than the predefined accuracy reduction tolerance value.

11. The non-transitory computer-readable medium of claim 1, wherein, after (L), the computer-readable instructions further cause the computing device to:
define second tokens for a document using the tokenizer, wherein the document is not included in the plurality of documents;
define third text windows from the defined second tokens based on the output, increased window size;
execute the output, trained network model with the defined third text windows to define third classification information;
classify the document using the defined third classification information to predict a class for the document; and
output the predicted class for the document.

12. The non-transitory computer-readable medium of claim 1, wherein, after (L), the computer-readable instructions further cause the computing device to:
define second tokens for each document of a second plurality of documents using the tokenizer, wherein each document of the second plurality of documents is not included in the plurality of documents;
define third text windows from the defined second tokens based on the output, increased window size;
execute the output, trained network model with the defined third text windows to define third classification information;
classify each document of the second plurality of documents using the defined third classification information to predict a class for each document of the second plurality of documents; and
output the predicted class for each document of the second plurality of documents.

13. The non-transitory computer-readable medium of claim 12, wherein the output, trained network model is executed with batches of the defined third text windows selected based on a predefined batch size.

14. The non-transitory computer-readable medium of claim 13, wherein the predefined batch size is a number of the third text windows.

15. The non-transitory computer-readable medium of claim 1, wherein, after (L), the computer-readable instructions further cause the computing device to:
define second tokens for each document of a second plurality of documents using the tokenizer, wherein each document of the second plurality of documents is not included in the plurality of documents;
(M) initialize a batch counter to zero and a batch to empty;
(N) select a next unprocessed document from the second plurality of documents;
(O) define third text windows from the defined second tokens of the selected next unprocessed document based on the output, increased window size;
(P) when a batch counter plus a number of the defined third text windows is less than or equal to a predefined maximum batch size,
update the batch counter with the number of the defined third text windows; and
add the defined third text windows to the batch;
(Q) repeat (N) through (P) until the batch counter plus the number of the defined third text windows is greater than the predefined maximum batch size;
(R) execute the output, trained network model with the batch to define third classification information;
(S) classify each document included in the batch using the defined third classification information to predict a class for each document included in the batch;
repeat (M) through (S) until each document of the second plurality of documents is processed; and
output the predicted class for each document of the second plurality of documents.

16. A computing device comprising:
a processor; and
a non-transitory computer-readable medium operably coupled to the processor, the computer-readable medium having computer-readable instructions stored thereon that, when executed by the processor, cause the computing device to define tokens for each document of a plurality of documents using a tokenizer;

(A) define text windows from the defined tokens based on a window size, where the window size indicates a number of tokens to include in each text window of the text windows, wherein the text windows are defined in a textual order from each document;

(B) train a network model with the defined text windows to define first classification information, wherein the network model includes a transformer network, a pooling network, and a classifier network, wherein the defined text windows are input to the transformer network, wherein a transformer output of the transformer network is input to the pooling network, wherein a pooled output of the pooling network is input to the classifier network, wherein the first classification information is an output of the classifier network;

(C) classify each document of the plurality of documents using the first classification information to define a predicted class for each document;

(D) compute a first accuracy value by comparing the predicted class defined for each document to a predefined class defined for each document;

(E) reduce the window size using a predefined reduction factor value;

(F) define second text windows from the defined tokens based on the reduced window size;

(G) train the network model with the defined second text windows to define second classification information;

(H) classify each document of the plurality of documents using the second classification information to define a second predicted class for each document;

(I) compute a second accuracy value by comparing the second predicted class defined for each document to the predefined class defined for each document;

(J) compute an accuracy reduction value from the computed second accuracy value relative to the first accuracy value;

(K) when the computed accuracy reduction value is greater than or equal to a predefined accuracy reduction tolerance value, repeat (E) through (K) until the computed accuracy reduction value is less than the predefined accuracy reduction tolerance value; and (L) when the computed accuracy reduction value is less than the predefined accuracy reduction tolerance value,
increase the window size using the predefined reduction factor value;
define final text windows from the defined tokens based on the increased window size;
train the network model with the defined final text windows; and
output the increased window size and the network model trained with the defined final text windows.

17. A method of training a classification model, the method comprising:

defining, by a computing device, tokens for each document of a plurality of documents using a tokenizer;

(A) defining, by the computing device, text windows from the defined tokens based on a window size, where the window size indicates a number of tokens to include in each text window of the text windows, wherein the text windows are defined in a textual order from each document;

(B) training, by the computing device, a network model with the defined text windows to define first classification information, wherein the network model includes a transformer network, a pooling network, and a classifier network, wherein the defined text windows are input to the transformer network, wherein a transformer output of the transformer network is input to the pooling network, wherein a pooled output of the pooling network is input to the classifier network, wherein the first classification information is an output of the classifier network;

(C) classifying, by the computing device, each document of the plurality of documents using the first classification information to define a predicted class for each document;

(D) computing, by the computing device, a first accuracy value by comparing the predicted class defined for each document to a predefined class defined for each document;

(E) reducing, by the computing device, the window size using a predefined reduction factor value;

(F) defining, by the computing device, second text windows from the defined tokens based on the reduced window size;

(G) training, by the computing device, the network model with the defined second text windows to define second classification information;

(H) classifying, by the computing device, each document of the plurality of documents using the second classification information to define a second predicted class for each document;

(I) computing, by the computing device, a second accuracy value by comparing the second predicted class defined for each document to the predefined class defined for each document;

(J) computing, by the computing device, an accuracy reduction value from the computed second accuracy value relative to the first accuracy value;

(K) when the computed accuracy reduction value is greater than or equal to a predefined accuracy reduction tolerance value, repeating, by the computing device, (E) through (K) until the computed accuracy reduction value is less than the predefined accuracy reduction tolerance value; and (L) when the computed accuracy reduction value is less than the predefined accuracy reduction tolerance value,
increasing, by the computing device, the window size using the predefined reduction factor value;
defining, by the computing device, final text windows from the defined tokens based on the increased window size;
training, by the computing device, the network model with the defined final text windows; and
outputting, by the computing device, the increased window size and the network model trained with the defined final text windows.

18. The method of claim 17, wherein a document of the plurality of documents is selected from a group consisting of an email, a paper, a book, a text message, a chat box conversation, a conversation converted to text, a tweet, and a webpage.

19. The method of claim 17, wherein a token of the tokens is a single word or a group of words.

20. The method of claim 17, wherein the transformer network includes a bidirectional encoder representations from transformers network.

21. The method of claim 17, wherein the pooling network is selected from the group consisting of a maximum pooling layer, a mean pooling layer, and a recurrent neural network.

22. The method of claim 17, wherein the accuracy reduction value is computed using $$r = 1 - \frac{a}{a_b},$$

where r is the accuracy reduction value, a is the computed second accuracy value, and $a_b$ is the first accuracy value.

23. The method of claim 17, wherein the window size is increased using $$S = \frac{s}{f},$$

where s is the window size, and f is the predefined reduction factor value that is greater than zero and less than one.

24. The method of claim 17, wherein the window size is reduced using s=s*f, where s is the window size, and f is the predefined reduction factor value that is greater than zero and less than one.

25. The method of claim 17, further comprising, after (I) and before (J), updating, by the computing device, the first accuracy value with the computed second accuracy value when the computed second accuracy value is greater than the first accuracy value, and repeating, by the computing device, (E) through (K) until the computed accuracy reduction value is less than the predefined accuracy reduction tolerance value.

26. The method of claim 17, further comprising, after (L):
  defining, by the computing device, second tokens for a document using the tokenizer, wherein the document is not included in the plurality of documents;
  defining, by the computing device, third text windows from the defined second tokens based on the output, increased window size;
  executing, by the computing device, the output, trained network model with the defined third text windows to define third classification information;
  classifying, by the computing device, the document using the defined third classification information to predict a class for the document; and
  outputting, by the computing device, the predicted class for the document.

27. The method of claim 17, further comprising, after (L):
  defining, by the computing device, second tokens for each document of a second plurality of documents using the tokenizer, wherein each document of the second plurality of documents is not included in the plurality of documents;
  defining, by the computing device, third text windows from the defined second tokens based on the output, increased window size;
  executing, by the computing device, the output, trained network model with the defined third text windows to define third classification information;
  classifying, by the computing device, each document of the second plurality of documents using the defined third classification information to predict a class for each document of the second plurality of documents; and
  outputting, by the computing device, the predicted class for each document of the second plurality of documents.

28. The method of claim 27, wherein the output, trained network model is executed with batches of the defined third text windows selected based on a predefined batch size.

29. The method of claim 28, wherein the predefined batch size is a number of the third text windows.

30. The method of claim 17, further comprising, after (L):
  defining, by the computing device, second tokens for each document of a second plurality of documents using the tokenizer, wherein each document of the second plurality of documents is not included in the plurality of documents;
  (M) initializing, by the computing device, a batch counter to zero and a batch to empty;
  (N) selecting, by the computing device, a next unprocessed document from the second plurality of documents;
  (O) defining, by the computing device, third text windows from the defined second tokens of the selected next unprocessed document based on the output, increased window size;
  (P) when a batch counter plus a number of the defined third text windows is less than or equal to a predefined maximum batch size,
    updating, by the computing device, the batch counter with the number of the defined third text windows; and
    adding, by the computing device, the defined third text windows to the batch;
  (Q) repeating, by the computing device, (N) through (P) until the batch counter plus the number of the defined third text windows is greater than the predefined maximum batch size;
  (R) executing, by the computing device, the output, trained network model with the batch to define third classification information;
  (S) classifying, by the computing device, each document included in the batch using the defined third classification information to predict a class for each document included in the batch;
  repeating, by the computing device, (M) through (S) until each document of the second plurality of documents is processed; and
  outputting, by the computing device, the predicted class for each document of the second plurality of documents.

* * * * *

UNITED STATES PATENT AND TRADEMARK OFFICE
CERTIFICATE OF CORRECTION

| | |
|---|---|
| PATENT NO. | : 11,074,412 B1 |
| APPLICATION NO. | : 17/202413 |
| DATED | : July 27, 2021 |
| INVENTOR(S) | : Samuel Paul Leeman-Munk et al. |

Page 1 of 1

It is certified that error appears in the above-identified patent and that said Letters Patent is hereby corrected as shown below:

In the Specification

Column 12, Line 24:
Delete the phrase "fraction value may be 0.8" and replace with --fraction value $f_v$ may be 0.8--.

Column 15, Line 17:
Delete the phrase "window sizes is shown" and replace with --window size $s$ is shown--.

Column 18, Lines 64-65:
Delete the phrase "When $i_b$ $i_d \leq i_x$," and replace with --When $i_b + i_d \leq i_x$,--.

In the Claims

Claim 8, Column 21, Line 43:
Delete the phrase "$S = \frac{s}{f}$" and replace with --$s = \frac{s}{f}$--.

Claim 23, Column 25, Line 21:
Delete the phrase "$S = \frac{s}{f}$" and replace with --$s = \frac{s}{f}$--.

Signed and Sealed this
Twenty-second Day of February, 2022

Drew Hirshfeld
*Performing the Functions and Duties of the
Under Secretary of Commerce for Intellectual Property and
Director of the United States Patent and Trademark Office*